March 4, 1924.

R. W. MYERS

SPRING MOTOR 1,485,692

Original Filed March 8, 1921      3 Sheets-Sheet 1

Inventor.
Romaine W. Myers

March 4, 1924.

R. W. MYERS

SPRING MOTOR

Original Filed March 8, 1921   3 Sheets-Sheet 2

1,485,692

Inventor,
Romaine W. Myers
By Ackert & Totten
Attorneys

March 4, 1924.
R. W. MYERS
SPRING MOTOR
Original Filed March 8, 1921   3 Sheets—Sheet 3
1,485,692
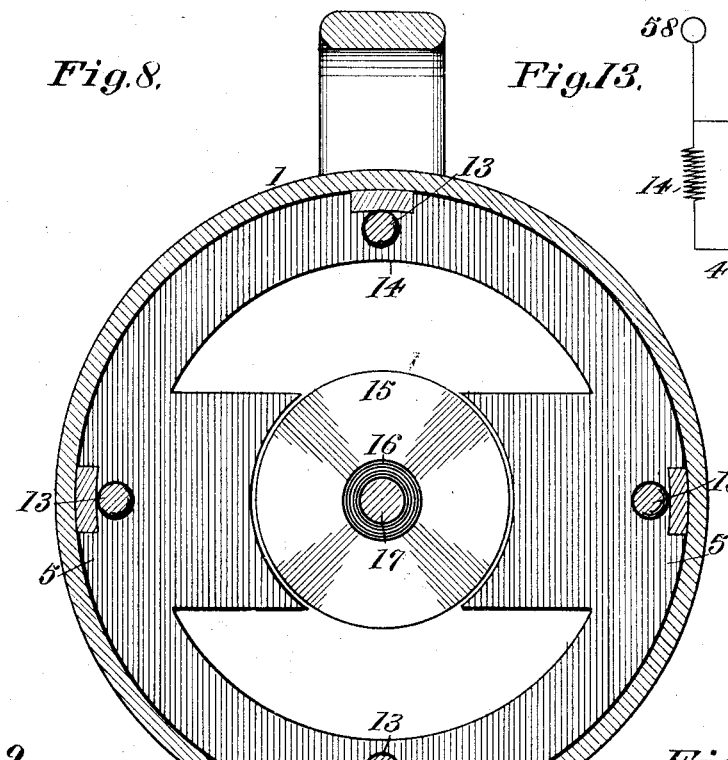
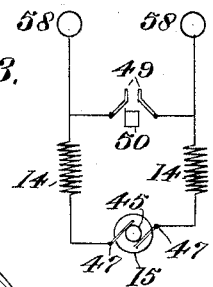
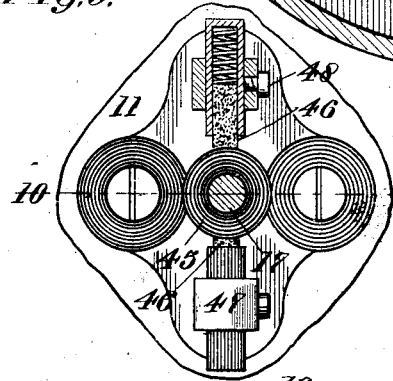
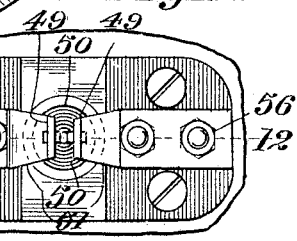
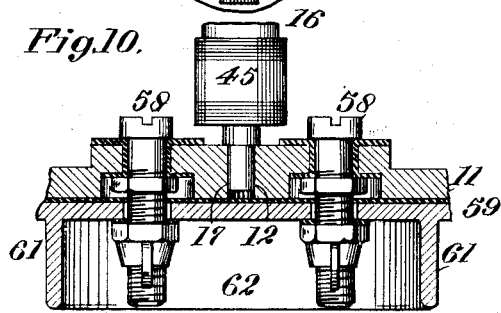
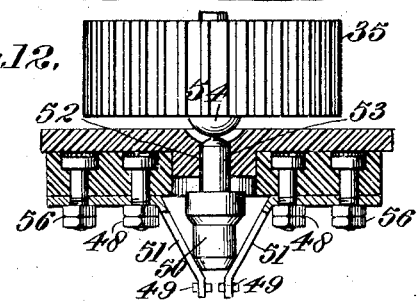
Inventor.
Romaine W. Myers.
By Acker Totten
attorneys.

Patented Mar. 4, 1924.

1,485,692

UNITED STATES PATENT OFFICE.

ROMAINE W. MYERS, OF OAKLAND, CALIFORNIA, ASSIGNOR TO CALIFORNIA CAP COMPANY, OF OAKLAND, CALIFORNIA, A CORPORATION OF CALIFORNIA.

SPRING MOTOR.

Original application filed March 8, 1921, Serial No. 450,599. Divided and this application filed July 5, 1922. Serial No. 572,897.

*To all whom it may concern:*

Be it known that I, ROMAINE W. MYERS, a citizen of the United States, residing at Oakland, in the county of Alameda and State of California, have invented certain new and useful Improvements in Spring Motors, of which the following is a specification.

The present invention relates broadly to a dynamo electric machine, and more particularly to an electric exploder capable of being transported from place to place, and of generating sufficient power when actuated for igniting or exploding a number of blasting caps or other blasting devices.

This application is a division of the application Serial No. 450,599, filed March 8th, 1921, entitled Dynamo electric machines, and the principal object of this invention is to provide an improved spring motor principally designed for imparting high speed rotation to an element requiring the same for its successful operation.

One of the principal objects of the invention is to provide a portable apparatus for generating current constructed in such manner that the current delivered thereby rapidly attains its peak load when delivered to the exploding circuit, and gradually diminishes instead of gradually increasing and gradually diminishing as is the case with machines for this purpose now on the market.

A further object is to provide an apparatus employing a spring motor and planetary transmission and overrunning clutch between the spring motor and armature.

A further object is to provide a means for preventing the release of the spring until the same is completely wound.

Another object is to provide a means for limiting the winding and unwinding of the spring.

A further object is to provide protectors for the wire terminals and for the winding and pawl shafts.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings:—

Figure 8 is a sectional view taken on line 8—8 of Figure 1.

Figure 9 is a view in elevation of the commutator and brushes.

Figure 10 is a sectional view taken on line 10—10 of Figure 9 illustrating the terminals for the exterior circuit.

Figure 11 is a detail view in elevation of the contact associated with the generator field.

Figure 12 is a sectional view taken on line 12—12 of Figure 11, and

Figure 13 is a wiring diagram of the apparatus.

Figure 1:
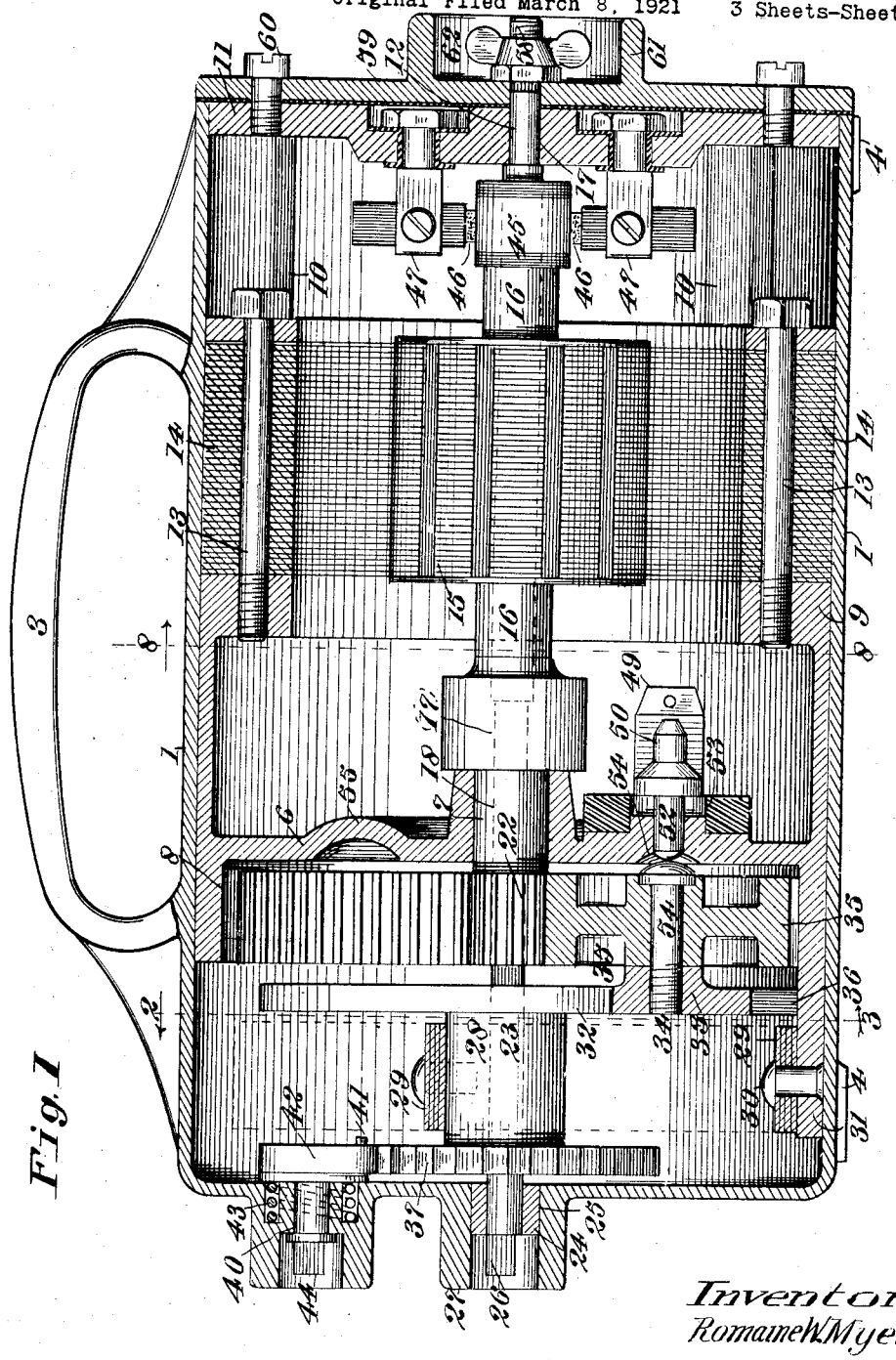
Figure 1 is a longitudinal sectional view of the preferred embodiment of my invention.
Figure 2:
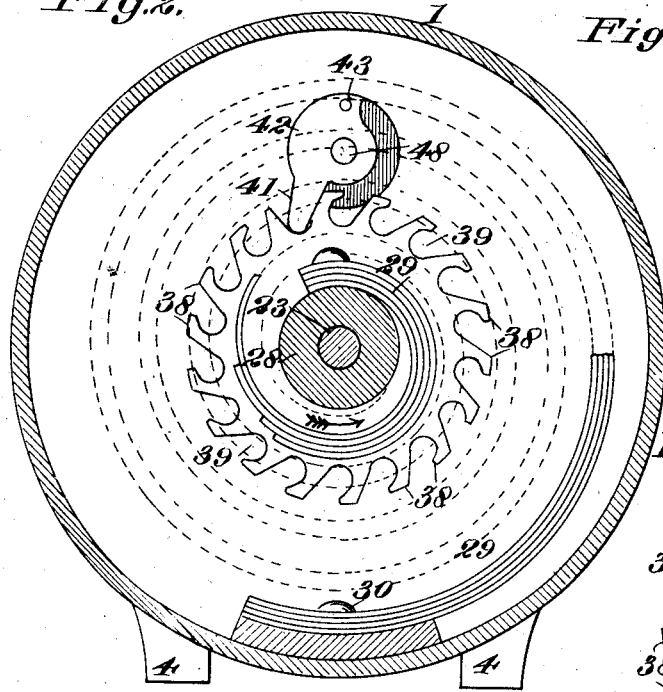
Figure 2 is a sectional view taken on line 2 viewed in the direction of the arrow.

In the drawings, wherein like characters of reference designate corresponding parts, 1 indicates a metallic shell or casing open at one end and closed at its opposite end by the wall 2, said casing being provided preferably with a carrying or transporting handle 3 and supporting legs 4. Removably positioned within said casing, through its open end, is an inner casing or support 5, cylindrical in form and divided near one end by a transverse wall 6 formed in its center with a bearing opening 7. The portion of said member 5 beyond the wall 6 is interiorly toothed forming an annular gear 8. The opposite end of the member 5 is flanged as at 9, and extending therefrom are guide members 10 preferably four in number, and particularly illustrated in Figure 8. The surfaces of these members carrying out the general contour of the periphery of the solid portion of the member 5. An end closure plate 11 is received within and closes the open end of the casing 1 and abuts against the ends of the members 10, the same being provided with a bearing opening 12 in line with the opening 7 in the wall 6.

Secured to the flange 9 by the retainers or bolts 13 are the annular laminations 14 of a generator or dynamo field, the same being held from rotation by interlocking with the members 10, as in Figure 8 of the drawings, and within said field operates an armature 15 mounted on a tubular shaft 16 through which extends a supporting shaft 17, one end of which is received in the bearing 12, the opposite end of which is received in a stub shaft 18 rotatably mounted in the bearing 7. The tubular shaft 16 is provided at one end with a recess 19 surrounding the shaft 17, and in which recess is received the enlarged end of the stub shaft 18, which enlarged end of said shaft is provided on its periphery with the roller clutch receiving depressions 20, in each of which is received a roller clutch 21.

The stub shaft 18 at a point adjacent the wall 6 is formed with gear teeth providing a pinion 22, and said shaft beyond said pinion is cylindrical in form, and is reduced as at 23, its end passing through a bearing 24 in an opening 25 in the end wall 2 of the casing 1. The end of said shaft 23 is preferably triangular in plan, as at 26, Figure 5 of the drawings, providing a key end which is surrounded by an outstanding flange 27 on the wall of the end 2, providing a key socket surrounding the portion 26, and at the same time protecting the end 26 of said shaft 23.

The power mechanism for said armature is preferably constructed in the following manner:—Mounted to rotate on the member 23 is a hub 28 provided at opposite sides with flanges, and to the center of said hub is secured one end of a spring 29, the opposite end of which is secured as at 30 to a stop finger or arm 31, extending from the end of the member 9 beyond the gear 8, said portion 31 providing a spring anchor and stop. The flange 32 adjacent the annular gear 8 carries at diametrically opposite points arms 33, laterally from which project trunnions 34, each mounting a planetary gear 35, said gears being in mesh with the annular gear 8 and with the pinion 22. One of the arms is provided with a stop finger 36 which is adapted on the winding and unwinding of the spring 29 to contact with opposite sides of the stop 31, thus controlling the degree of winding and unwinding of said spring.

Figure 4:
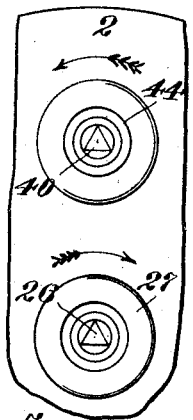
Figure 4 is a view in detail elevation of the key shafts for the spring motor and pawl.

During the unwinding of the motor, it will be observed that the member 23 is rotated in the direction of the arrow, Figure 4, and the same through the pinion 22, operates gears 35 to move over the surface of the gear 8, imparting a reverse or winding movement to the hub 28, and during this operation the clutch rollers 21 remain in the deepest portion of their recesses 20, due to the reverse movement of said shaft 23.

Figure 5:
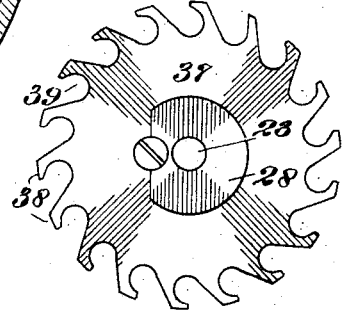
Figure 5 is a view in elevation of the ratchet associated with the hub of the spring motor and illustrating the peripheral teeth.
Figure 3:
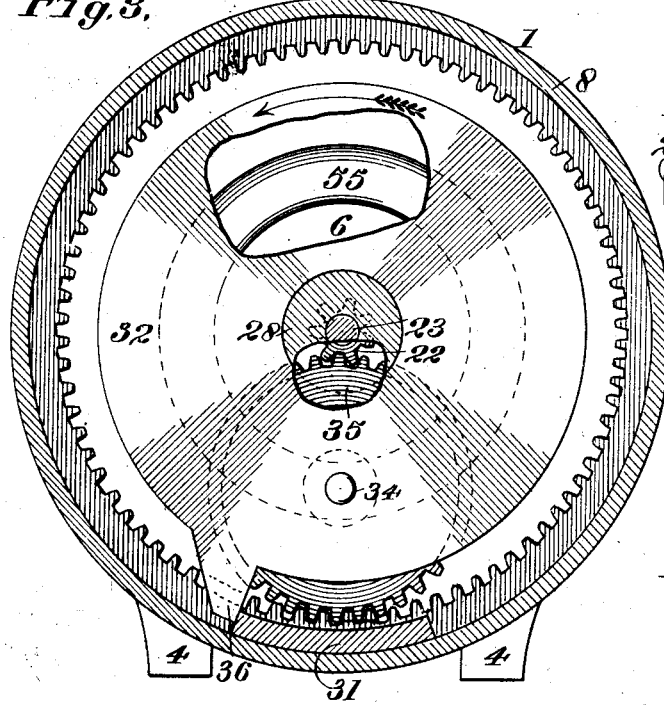
Figure 3 is a vertical sectional view taken on line 3 viewed in the direction of the arrow.
Figure 6:
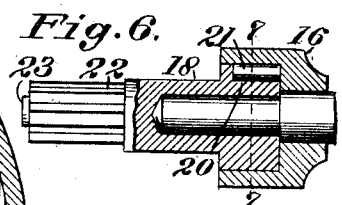
Figure 6 is a broken detail of the planetary transmission pinion and overrunning clutch.
Figure 7:
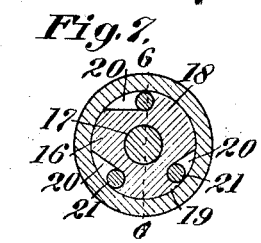
Figure 7 is a sectional view taken on line 7—7 of Figure 6.

The flange 37 on the opposite end of the hub 28 is peripherally toothed forming a ratchet disc, and as in Figure 5 of the drawings, each tooth of said ratchet disc with the exception of one, is provided with an overhanging lip 38 providing in said teeth so formed pawl receiving pockets 39. Pivotally mounted on a key shaft 40 rotatable within an opening in the end wall 2 above the opening 25 is a retaining pawl 41 disposed to be received during the winding rotation of the ratchet disc within the ratchet teeth thereof, and said pawl projects from a hub 42 with which is secured one end of the spring 43 coiled about the shaft 40 and anchored in the end wall 2, said spring normally forcing the said pawl into engagement with the ratchet teeth. The shaft 40 at its outer end is triangular in plan, or of key formation, and is received within a pocket 44 in the end wall, which pocket provides a key seat and a protector for the end of the shaft. The lipless tooth of the ratchet disc is so disposed on the same as to co-act with the retaining pawl 41 at such time as the spring 29 is fully wound, and to co-operate with said pawl only once during the full winding of said spring. Thus it will be apparent that, as the lips 38 prevent the removal of the pawl 41 from the other ratchets during the winding of the spring, the registering of the lipless tooth with the pawl 41 will enable the spring to be released only after the same is fully wound, thus insuring the transmitting of the maximum power output of the spring to the armature on each operation of the apparatus.

With the commutator 45 of the armature 15 contact the spring pressed brushes 46, and from the support 47 thereof extend suitable conductors connected with the generator field.

From the opposite end of the field extend posts 48 associated with the co-operating spring contacts 49, a suitable switch or other contact device preferably carried by the dividing wall 6. The tendency of said fingers 49 is to contact, and to separate the same. A wedge or separator 50 having a bevelled end is positioned to reciprocate between the inclined portions 51 of said fingers, and the same is provided with an operating guide stem 52 received in an opening 53 in the dividing wall 6. One of the trunnions 34 is provided with a rounded head 54 received in an annular groove 55 in the outer face of the wall 6, and the same is adapted to engage with the rounded end 53 of the stem 52 at such time as the finger 36 contacts with the stop 30 on the full unwinding of the spring 29, as in Figure 1 of the drawings, forcing said member 50 outwardly to separate the fingers 51, as in Figures 11 and 12 of the drawings. From posts 56 associated with fingers 50 extend leads 57 connected with terminals 58 carried by the plate 11 and extending through openings in a finishing plate 59 positioned over the open end of the casing 1, and held to the plate 11 by screws 60. The terminals 58 are protected by an outwardly projecting flange 61, providing a pocket 62 surrounding the said terminals.

It will be apparent that the present generator is so constructed as to discharge through the terminals to the external circuit, the generated power only on the armature attaining its maximum speed of rotation; this being accomplished by the actuation of the contact fingers 50 immediately on the spring 29 becoming completely unwound, and on the actuating of the armature and the complete unwinding of the spring 29, the overrunning clutch permits of free rotation of the armature relative to said power mechanism.

It will also be observed that a simple planetary transmission developing the maximum power output from a spring is employed between the spring and armature, and also that the spring winding mechanism and release feature is constructed in such manner that with a single key for winding and releasing, it is impossible to release or operate the apparatus until such time as the spring is fully wound, thus precluding the failure of the armature to rotate at the required speed to generate the necessary power.

Having thus described my invention what I claim as new and desire to protect by Letters Patent of the United States is:—

1. In combination with a rotatably mounted element, a spring actuated planetary transmission associated therewith for operating the same, a connection between the transmission and said element including an overrunning clutch, a peripherally toothed ratchet associated with said spring, one of the teeth of said ratchet being mutilated, and a spring held pawl co-operating with the ratchet for retaining the spring in its wound position, said pawl adapted for releasing from said ratchet only when the same is in co-operation with said mutilated tooth.

2. In combination with a rotatably mounted element, an operating spring therefor, a key actuated stem for operation to place said spring under operating tension, a releasable member for retaining said spring under operating tension, a key operated stem associated therewith, said stems extending through the casing wall, said casing wall provided with a plurality of depressions within which the extended ends of said stems are received.

3. In combination with a rotatably mounted element, a casing, an element operating spring, a hub mounting one end thereof, an arm extended from the hub, a planetary transmission between the spring and element and including a planetary idler pinion carried by said arm, means for winding said spring, releasable means for holding said spring while winding, and a stop within which said arm contacts for limiting the winding and unwinding of said spring.

4. An apparatus for the described purpose, comprising a rotatably mounted element, an impulsively operated spring motor arranged with its winding axis in alignment with said element, a planetary gearing intermediate said motor and element for operatively connecting the same, a shell mounting said element and retaining the same in operative relation, a protecting casing within which said shell is removably mounted and closed at one end, and means operatable from the exterior of the casing for winding the motor, and a motor release part operatable from the exterior of the casing.

5. In combination with a rotatably mounted element, a spring connected planetary transmission associated therewith for operating the same, means for winding the spring, a connection between the transmission and said element including an overrunning clutch, a ratchet associated with said spring, a spring held pawl co-operating with the ratchet for retaining the spring in its wound position, an arm movable with the spring during its winding and unwinding movements, and a stationary stop for engagement by the arm for limiting the movement of the planetary transmission in one direction and also for limiting the winding of the spring.

6. In combination with a freely rotatable element, a spring actuated planetary transmission associated therewith for operating the same, a driving connection between said transmission and said element including an overrunning clutch, a shaft to which said spring is connected, and adapted for rotation to wind said spring, releasable means for retaining the spring in its wound position, including a hooked tooth ratchet fixed to and rotating with the shaft, and a pawl co-operating with the teeth of the ratchet, a stop for limiting the winding and unwinding of the spring, an arm rotatable with the shaft for contacting with the stop, a pawl adapted to hold the spring as the tension of the same is increased, and only releasable when said spring is fully wound and said arm is in engagement with the stop.

7. An apparatus for the described purpose comprising a rotatably mounted element, a planetary transmission connected therewith, an impulsively operated spring motor for actuating said gear, means for winding the motor, a pawl and ratchet for retaining the motor wound, and a key actuated stem mounting the pawl adapted for operation only when the motor is fully wound to permit the release thereof.

8. An apparatus for the described purpose comprising a rotatably mounted element, a planetary transmission connected therewith, an impulsively operated spring motor for actuating said transmission, means for winding said motor including a pawl and ratchet mechanism, means for releasing the pawl from the ratchet only when the spring is fully wound, an arm associated with the transmission, a fixed stop, said stop adapted for engagement by said arm to limit the winding and unwinding of the transmission.

In testimony whereof I have signed my name to this specification.

ROMAINE W. MYERS.